March 6, 1962 — M. PROCHÁZKA — 3,023,610
METHOD OF AND APPARATUS FOR CARRYING OUT
FATIGUE TESTS OF TURBINE BLADES
Filed March 31, 1959
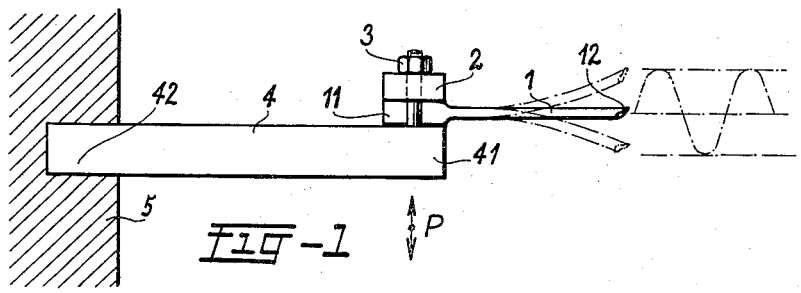
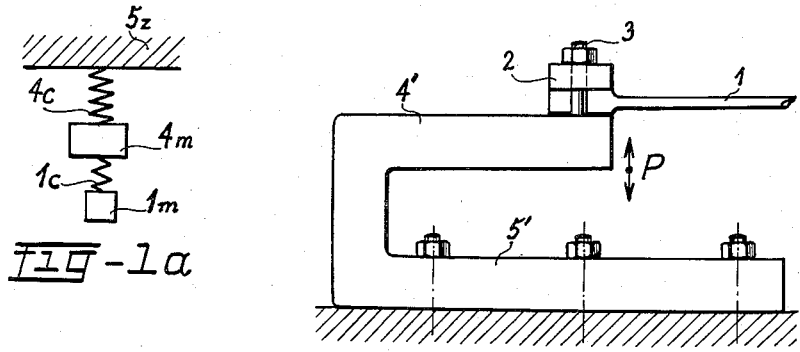
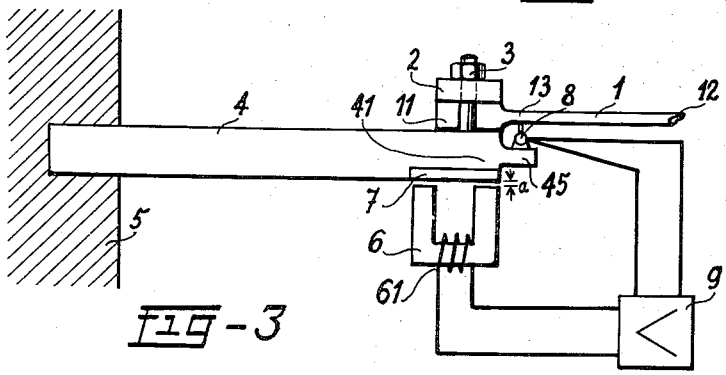
INVENTOR.
Miroslav Procházka

3,023,610
METHOD OF AND APPARATUS FOR CARRYING OUT FATIGUE TESTS OF TURBINE BLADES

Miroslav Procházka, Prague, Czechoslovakia, assignor to Elektropodnik Hlavniho Mesta Prahy, Prague, Czechoslovakia
Filed Mar. 31, 1959, Ser. No. 803,252
Claims priority, application Czechoslovakia Apr. 9, 1958
3 Claims. (Cl. 73—67.4)

The present invention relates to an apparatus for carrying out fatigue tests of turbine blades or other machine components subjected in operation to a stress by bending vibrations.

One of the most important partial tasks in the dynamic testing of components subject to bending vibrations, such as blades of steam or gas turbines, axial compressors etc. is the fatigue test, where it is necessary to imitate the least favourable stress of said components in operation during very long time intervals. Fatigue tests in these instances consist of generating resonant (free) vibrations of the tested component part for every given formation of the line of deflection i.e. vibrations without a nodal point with a free vibrating end, vibrations with one nodal point etc. It is a fact well known from the theory of vibrations that the shape of the line of dynamic deflection during vibration in resonance depends in the first place on the distribution of masses and on the stiffness along the vibrating component part. Any additional mass or stiffness changes the shape of the required line of deflection and thus also the manner in which stress is distributed along the tested part; consequently, the test is unreliable, as the results are distorted to a substantial degree. If reliable results of fatigue tests are to be obtained, resonance vibrations of the desired frequency and amplitude have to be generated without adding any further additional masses and stiffness to the tested part.

A number of solutions of this difficult problem have already been suggested but none of them meets fully these exacting requirements.

Devices are known (such as disclosed in German Patent No. 743,254), in which vibrations are generated in the blade by means of springs secured to the blade tip. The design of these springs has to be such, that their mass and stiffness should be negligible. It is extremely difficult to comply with this requirement which to a certain extent only can be fulfilled in instances of low resonant frequency.

For components consisting of ferromagnetic material a simplified excitation by means of an electromagnet, acting directly on the tested component part, may be made use of. (See for instance German patent specification No. 422,100 or 868,674.) Here the additional mass is, of course, entirely dispensed with, but the influence of the electromagnet on the tested article is the equivalent of an additional stiffness, acting on the tested component part, because the size of the air gap between the electromagnet and the vibrating component part is subject to variations during the vibrations. The additional stiffness produced in this way reaches considerable values. It has to be noted, however, that in contrast to a spring, this stiffness shows a negative value.

For the purpose of eliminating both the additional mass and the additional stiffness a number of devices are used for fatigue tests, such devices representing modifications of a vibrating table to which the tested component part (blade) is secured. The bending vibrations of the blades are in this case generated by the seismic influence of the blade mass. It is obvious that this seismic effect influences in turn the vibrations of the table and in order to restrict this drawback to the minimum it is essential that the mass of the blade should be negligible in relation to the mass of the vibrating table (vibrator). The ratio of the two masses has to be within a range from 100 to 1000. The necessary increase in the mass of the vibrator, when vibrations of the required magnitude have to be obtained, necessitates, however, a very costly and intricate exciting apparatus; for instance in vibration generators with electric excitation very costly amplifiers with high output have to be used.

The aforesaid shortcomings of the hitherto known devices are removed to a substantial degree by the apparatus embodying the present invention. The invention is based on the known seismic excitation of bending vibrations (as disclosed in the preceding paragraph), but permits a substantial improvement of the technical properties of the whole apparatus, in particular by reducing the weight of the vibrator and thus also the requirements on the feeding sources.

According to the main feature of the present invention a set of two systems performing bending vibrations is provided, the first system vibrating with small amplitudes far below its natural resonance and consisting for instance of a carrying arm at the end of which there is secured the other system formed by the tested component part, which vibrates with the frequency of free oscillations (i.e. in natural resonance).

In order to explain the principle and operation of the present invention several embodiments are shown diagrammatically by way of example in the accompanying drawing.

FIG. 1 shows the basic diagram of the apparatus,

FIG. 1a shows an equivalent system for linear oscillations,

FIG. 2 shows an alternative arrangement of a bent carrier adapted to receive the tested component, and FIG. 3 illustrates a further alternative design of the apparatus.

Referring to FIG. 1 showing the basic diagram of the apparatus, it will be seen that the tested component, i.e. the blade 1, is secured at its root 11 by means of a plate 2 and screws 3 to the free end 41 of a fixed carrier 4, which is subject to the influence of a variable force P. The position of the blade 1 is such that its longitudinal axis forms substantially a continuation of the longitudinal axis of the carrier 4. To save space the blade 1 could be placed also in opposite direction, but for a correct operation it is important that both longitudinal axes i.e. the axis of the carrier 4 and of the blade 1 should be substantially parallel.

The fixed end 42 of the carrier is rigidly secured to the base wall 5, the dimensions of the carrier being chosen so that the lowest frequency of resonant vibrations of the whole system, i.e. the carrier 4, the clamping device 2, 3 and the mass of the blade 1, should be far above the frequency range of the tested vibrations of the blade 1. In the arrangement shown in the drawing, the carrier 4 has a substantially uniform cross-section so that the bending moment of inertia of the carrier at each point along the length thereof is at least as large as the bending moment of inertia at all other points between the point being considered and the free end of the carrier at which the blade 1 is secured. In this system the amplitude of vibrations in each point is proportional to the acting force P, the amplitude of vibration at the free end 41 of the carrier being very small in relation to the amplitude of vibration at the free end 12 of the blade.

From the aspect of dynamics, this system, performing bending vibrations, can be compared to an equivalent system for linear transverse oscillations, such as shown in FIG. 1a. In this diagram the carrier 4 is represented by a member 4c of predetermined stiffness and by a mass 4m and in a similar way the reference 1c denotes the equivalent stiffness of the blade 1, whereas 1m is its equivalent mass. If the natural frequency of vibrations of the system of both masses 4m and 1m, suspended on base member 5z by means of the member 4c of predetermined stiffness (spring) is substantially higher than the natural frequency of vibrations of the system 1m, 1c then for producing resonant vibrations of the system 1m, 1c it will be sufficient if the mass 4m has only very slight oscillations imparted thereto, but naturally at the frequency of these resonant vibrations.

Such systems are in principle known in dynamics and used for the damping of oscillations where the system 1m, 1c represents a so-called dynamic damper for the system 4c, 4m, because in the case of a vibration frequency equalling the resonant frequency of the dynamic damper 1m, 1c the vibrations of the mass 4m are damped to all practical purposes.

This phenomenon may be explained as follows: If a vibrating system comprising a mass 4m and a stiffness or spring 4c has attached thereto another system comprising a mass 1m and stiffness 1c, and the first system is vibrated, both systems will vibrate in accordance with their dynamic relations, and practically with the same frequency which corresponds to the exciting frequency. If, however, the exciting frequency is changed, the amplitudes of the two systems are likewise changed. If it is assumed that the natural frequency $f_4$ i.e. the resonant frequency of the system 4m—4c is far higher than the natural frequency $f_1$ of the system 1m—1c, and the exciting frequency with a constant amplitude increases from zero, the amplitude of vibration the mass 1m increases too and reaches its maximum at the frequency $f_1$. At this moment the mass 1m vibrates with its resonant frequency $f_1$ and practically takes over the entire exciting energy, with the consequence that the amplitude of the mass 4m reaches its minimum.

If the exciting frequency were increased still further, the amplitude of vibration of the mass 1m would decrease again and the amplitude of vibration of the mass 4m would increase. If the exciting frequency equals exactly the resonant frequency of the second system, then this system may be considered a dynamic vibration damper. Such arrangements are used in machinery, where one part (for example a shaft), which is subject to vibrations of a frequency $f_1$ is damped by providing the shaft with a system the resonant frequency of which is also $f_1$ so that such system absorbs practically the entire exciting vibration energy.

This phenomenon occurs, of course, not only in connection with compression and tension vibrations but also with torsional and bending vibrations. It is an important feature of the present invention that a dynamic damper is used for bending vibrations in an apparatus for bending fatigue tests, wherein the test-piece itself forms the dynamic vibration damper being thus set into maximum resonance vibrations at minimum amplitudes of the main system i.e. of the carrier.

FIG. 2 shows an alternative arrangement of a curved carrier to which the tested component is fixed. The carrier in the example represented in the drawing has the shape of an arm 4' of a rigidly secured yoke 5'. The principle and operation of the system are not changed by such a provision, but in this case also the shape of the carrier has to be taken into account in the calculation, the shape having a considerable influence on the frequency of the resonant vibrations of the carrier.

FIG. 3 shows the means provided for electric excitation and picking up the oscillations in the system according to FIG. 1 or 2.

The excitation is effected by means of an electromagnet 6 fed by an alternating voltage with a frequency corresponding to the resonant frequency of the tested system (i.e. blade 1). This type of excitation is highly advantageous and represents a major contribution of the invention to the art. In order that the resonant frequency of the carrier 4 should be safely above all resonant frequencies of the examined vibrations of the blades, the carrier 4 has to be very rigid. This circumstance permits the use of a powerful electromagnet 6, with only a slight air gap $a$ separating the electromagnet 6 from the end of the carrier edge. The choice of the small air gap is, of course, made possible also because of the very small vibrations of the carrier 4 in operation.

The vibrations are damped by the blade 1 vibrating with free oscillations, said blade, as disclosed above, forming a dynamic damper of the carrier 4.

If a carrier 4 of a non-ferromagnetic material is used so as to obtain a high degree of rigidity in relation to its mass, the electromagnetic excitation by means of the electromagnet 6 may be effected by providing the end of the carrier 4 with an iron plate 7 (or with a strip of another ferromagnetic material such as transformer sheets) as also shown in FIG. 3.

The design of the device according to the invention further permits a very simple and advantageous picking up or measuring of the amplitude and frequency of vibrations of the tested blade. The pick-up member 8 (FIG. 3) secured to an extension 45 of the carrier 4 measures the relative movement between the end 41 of the carrier and a point 13 in the vicinity of the blade root 11. The magnitude of the deflection in the contact point 13 can very easily be converted into the magnitude of deflection of the blade tip 12 or, if required, the gauge or pick-up member 8 can be directly calibrated in relation to the vibrations of the blade tip 12.

FIG. 3 shows also a very efficient and reliable arrangement for the excitation of vibrations with a so-called positive feedback. The exciting coil 61 of the electromagnet 6 is in this case fed with an alternating electric voltage, the source of which is the pick-up member 8. From the latter the alternating electric voltage, having a magnitude proportional to the amplitude of the vibrations at the point 13 of the blade, is fed to an amplifier 9 in which, for the purpose of stabilizing the excitation of vibrations a phase shifter may be interposed. The suitably amplified alternating voltage, with the frequency of resonant vibrations of the blade and a suitable phase shift, causes in this case an excitation of the electromagnet 6, with the result that all outer influences such as temperature, fatigue of the material and the like are automatically compensated and the tested component part is vibrated at its resonant frequency during the whole duration of the test.

The advantages of the invention may be summed up as follows:

(1) A relatively small exciting energy produces a large amplitude of the bending vibrations of the test-piece.

The minimum movement of the carrier results in transferring substantially the entire energy to the vibrating test-piece, the vibration energy of the carrier being utterly insignificant.

(2) According to the invention highly favourable conditions for the excitation by means of an electromagnet are created. Considering that the movement of the carrier is extremely small, a minute air gap may be provided between the electromagnet and the excitation point of the carrier with the result that a high efficiency is achieved. It is well known that the efficiency of magnetic transmission is inversely proportional to the size of the air gap between the magnet and the armature.

(3) The dimensions of the exciting magnet and of the armature can be far larger than if the test-piece itself or a piece of iron provided on the test-piece were used as armature. Due to the great dimensions of the electromagnet a high vibration energy in great concentration can be imparted to the relatively small test-piece.

(4) The adjustment of the electromagnet in relation to the point of excitation of the carrier may be effected once for all and can then be used substantially unaltered in all instances, it being of course understood, that it is only the exciting frequency which has to be changed in order to accommodate a different resonant frequency of the test piece. It is a drawback of the previously known electromagnetic devices that the adjustment of the electromagnet has to be changed for every test-piece according to its shape, material and size.

(5) The preparations for the fatigue tests are thus reduced to a mere clamping of the test-piece in the carrier.

(6) Test-pieces of non-ferromagnetic or non-metallic material can be tested without any difficulty and without any additional equipment.

(7) The conditions to which the test-piece (turbine blade) is exposed in the apparatus according to the invention are very near the conditions prevailing in actual operation. It is further to be understood that, if as in previously proposed devices, the electromagnet acts directly on the blade during the test, the force to which the blade is subjected varies during every vibration in indirect proportion to the momentary size of the air gap. This effect can be compared to the effect of a spring, with the result that an additional negative stiffness of the blade has to be taken into account during the test, said stiffness causing, of course, an alternation of the dynamic properties of the blade. If the test-piece consists of a non-ferromagnetic material, the mass of the test-piece is increased by the piece of iron that has to be secured to the blade, which also leads to a considerable change in the dynamic properties. It is only in the arrangement according to the present invention that the natural dynamic line of deflection of the blade is in no way influenced by the excitation.

(8) Finally, it has to be noted that in the arrangement embodying the invention the entire blade is free during the test, with the exception of the root which, however, for all practical purposes is subject to no vibrations at all. This advantage is of great importance when an exact observation of the free surface of the vibrating blade is to be carried out, such as during the taking of slow motion-pictures etc. or if tests are carried out at elevated or low temperatures, when for example the vibrating part of the blade is placed in a furnace.

The system for carrying out fatigue tests according to the present invention shows, as disclosed above, a number of essential advantages. It should be emphasized that the weight of the carrier 4 or 4' can be reduced to a minimum value without the mass and stiffness of the carrier having any tangible influence upon the way in which the tested blade vibrates. This improves to a substantial degree the efficiency of transmitting the vibration energy to the blade, because with a small weight of the carrier 4 its excitation by an outer force requires a proportionally smaller vibration energy, with the result that the losses are very slight.

When electromagnetic excitation is used, the action of the magnet can be imagined as a fictitious spring with a negative stiffness, the magnitude of this stiffness depending on the size of the magnet and being indirectly proportional to the adjustment of the air gap $a$. This additional stiffness relates, however, to the carrier 4 only and is without any influence whatsoever on the tested part 1 itself, which vibrates without any additional masses or additional stiffness being imposed thereon, practically under the same conditions as if its natural vibrations were generated in operation.

I claim:

1. A fatigue testing apparatus for subjecting a test specimen to flexural vibrations, comprising a base, an elongated, cantilevered carrier rigidly fixed at one end to said base and having a far greater resistance to bending and a far greater natural frequency of flexural vibration than the test specimen, clamping means at the other free end of said carrier for rigidly securing one end of the test specimen to the latter so as to form a single vibrating unit therewith, a driving electromagnet disposed closely adjacent to said free end of the carrier to provide a small air gap therebetween and having an energizing coil, energizing circuit means for supplying alternating exciting current to said coil substantially at the natural frequency of the test specimen so that said electromagnet causes relatively small amplitude flexural vibration of said carrier which is transmitted to the test specimen to cause relatively larger amplitude flexural vibration of the latter, pick-up means carried by said free end of the carrier and engageable with the test specimen at a point on the latter spaced from said clamping means to generate an alternating control voltage at the natural frequency of flexural vibration of the test specimen and having a magnitude that corresponds to the amplitude of movement of said point on the test specimen relative to said free end of the carrier, and means feeding said control voltage into said energizing circuit means to control the frequency and magnitude of the alternating exciting current in accordance with the natural frequency of flexural vibration of the test specimen and said amplitude of movement, respectively.

2. A fatigue testing apparatus as in claim 1; wherein said carrier has a bending moment of inertia at each point along the length thereof which is at least as large as the bending moment of inertia at all other points between said point and said free end of the carrier.

3. A fatigue testing apparatus as in claim 2; wherein said carrier is of a non-ferromagnetic material so as to obtain a high degree of rigidity in relation to its mass, and said carrier has a ferro-magnetic insert adjacent said free end for cooperation with said electromagnet.

References Cited in the file of this patent
UNITED STATES PATENTS

| | | |
|---|---|---|
| 2,299,424 | Peters | Oct. 20, 1942 |
| 2,500,764 | MacGeorge | Mar. 14, 1950 |